United States Patent [19]

Wishneski et al.

[11] Patent Number: 5,328,938
[45] Date of Patent: Jul. 12, 1994

[54] ON-SITE GENERATION OF POLYURETHANE FOAM USING AN HCFC AS A SOLE BLOWING AGENT

[75] Inventors: Todd W. Wishneski, Cheshire; Wade T. Petroskey, North Haven, both of Conn.

[73] Assignee: BASF Corporation, Parsippany, N.J.

[21] Appl. No.: 96,503

[22] Filed: Jul. 26, 1993

Related U.S. Application Data

[62] Division of Ser. No. 24,881, Mar. 1, 1993.

[51] Int. Cl.$^5$ ................................................ C08J 9/14
[52] U.S. Cl. ........................................ 521/78; 521/79; 521/126; 521/127; 521/129; 521/131; 521/174; 521/917
[58] Field of Search ................. 521/131, 126, 155, 78, 521/79; 54/917

[56] References Cited

U.S. PATENT DOCUMENTS 5,032,623 7/1991 Keske et al. .......................... 521/131
5,264,464 11/1993 Wishneski et al. .................. 521/126

*Primary Examiner*—Morton Foelak
*Attorney, Agent, or Firm*—Dennis V. Carmen

[57] ABSTRACT

The present invention relates to an improved process for producing, by means of a portable foaming apparatus having a static mixer, a polyurethane foam by reacting a reaction mixture comprised of a polyol, an organic isocyanate, a foaming/frothing agent, and a reaction catalyst, the improvement comprising employing monochlorodifluoromethane as the sole blowing/frothing agent in said reaction in order to produce a CFC-free essentially closed-cell rigid or semi-rigid polyurethane foam. Also claimed is the foam produced by the above process.

10 Claims, No Drawings

ON-SITE GENERATION OF POLYURETHANE FOAM USING AN HCFC AS A SOLE BLOWING AGENT

This is a division, of application Ser. No. 08/024,881 filed Mar. 1, 1993.

FIELD OF THE INVENTION

This invention relates generally to polyurethane foams, and, more specifically, to the on-site generation of HCFC blown rigid polyurethane foams.

BACKGROUND OF THE INVENTION

In the production of polyurethane foams, a polyol is reacted with a polyisocyanate in the presence of a polyurethane catalyst and a blowing agent. Unfortunately, certain blowing agents, namely chlorofluorocarbons (so-called "CFCs"), are hazardous to the environment, specifically the ozone layer of the atmosphere. Hence, alternatives to the use of CFC's are being actively sought by the polyurethanes community.

The use of a portable foaming apparatus employing a foam forming formulation to provide on-site generation of polyurethane foam is well-known in the art. By way of illustration, U.S. Pat. No. 3,882,052 discloses the use of such an apparatus to provide non-froth polyurethane foam. For other applications, frothed foam is suitably produced using the portable foaming apparatus by incorporating into the foam forming formulation an auxiliary CFC blowing agent, such as dichloro-difouoromethane, commercially available as FREON 12, a product of DuPont Company. When injected into the foam forming mixture, the auxiliary blowing agent serves to augment the function of the static mixer in bringing about thorough blending of the foam forming ingredients. Since the auxiliary CFC blowing agent is hazardous to the environment, alternatives to the use of CFCs in the production of frothed foam would be highly desired by frothed foams manufacturers.

Heretofore, suitable alternatives have not been known based upon the knowledge of the present inventors.

SUMMARY OF THE INVENTION

In one aspect, the present invention relates to an improved process for producing, by means of a portable foaming apparatus having a static mixer, a polyurethane foam by reacting a reaction mixture comprised of a polyol, an organic isocyanate, a foaming/frothing agent, and a reaction catalyst, the improvement comprising employing monochlorodifluoromethane as the sole blowing/frothing agent in said reaction in order to produce a CFC-free essentially closed-cell rigid or semi-rigid polyurethane foam.

In another aspect, the present invention relates to the CFC-free foam produced by the above process.

These and other aspects will become apparent upon reading the following detailed description of the invention.

DETAILED DESCRIPTION OF THE EMBODIMENTS

Any polyurethane foam forming composition which is suitable for processing and dispensing by means of a portable foaming apparatus may be employed in preparing the polyurethane foam in accordance with the process of the present invention, provided that monochlorodifluoromethane is employed as the sole blowing/frothing agent. The composition typically comprises a polyol reactant, an organic isocyanate reactant, a foaming/frothing agent, a reaction catalyst and, preferably, a surfactant.

Immediately after completion of mixing of the components, the foam reaction mix is dispensed directly into the appropriate mold and foaming is allowed to take place in the mold in accordance with procedures well recognized in the art for the molding of polymer foams.

In a preferred embodiment, a "one-shot" method of foam fabrication is employed, whereby the isocyanate containing stream (commonly referred to as the "A-side") and the polyol-containing and catalyst-containing stream (commonly referred to as the "B-side") are mixed. Each of these streams are preferably liquids in which all of the various additives are preferably soluble, although dispersions utilizing solid components can be employed if desired. In accordance with a more preferred embodiment of the present invention, the B-side contains polyol, blowing again, and a surfactant to assist in foam cell formation.

A typical "B-side" formulation is prepared by blending:

POLY-G 71-530 and POLY-G 71-357 in a ratio of 3:1 (both patents are sucrose-diethanolamine-based propoxylated polyols), products of Olin Corporation; 100.0 grams L-5420 (a silicone surfactant), a liquid product of Union Carbide Corporation; 2.0 grams Dimethylethanolamine (catalyst), a product of Air Products; 0.5 grams Fluorocarbon R-22 (a monochlorodifluoro-methane blowing agent), a product of E. I. DuPont de Nemours & Company, Inc.; 40.0 grams After thorough mixing of this blend at room temperature, the blend forms a clear solution having a viscosity of about 300 cps at room temperature.

The polyols which are used in the subject invention are well known in the art and are preferably those referred to as polyether polyols and/or polyester polyols or a combination thereof. The polyether polyols are prepared by the reaction of an alkylene oxide with polyhydric or polyamine-containing compounds, or mixtures thereof. Alkylene oxides which may be employed in the preparation of the polyols of the present invention include ethylene oxide, propylene oxide, butylene oxide, styrene oxide and the like. Halogenated alkylene oxides may also be used such as epichlorohydrin, 3,3,3-trichlorobutylene oxide, etc. Mixtures of any of the above alkylene oxides may also be employed. The preferred alkylene oxide is propylene oxide, or a mixture of propylene oxide with ethylene oxide.

Polyoxyalkylene polyether polyols are preferred and generally contain either primary or secondary hydroxyl groups, or mixtures thereof. These polyols are suitably prepared by reacting an active-hydrogen containing compound, such as polyhydric compounds or polyamines, with the above-described alkylene oxides. Useful polyhydric compounds include ethylene glycol, propylene glycol, diethylene glycol, dipropylene glycol, glycerol, pentaerythritol, sorbitol, sucrose, methyl glucoside, glucose, etc. Polyamine compounds which may be reacted with the alkylene oxide to prepare amine-based polyols include mono-, di-, and triethanol amine, ethylene diamine, diethylene diamine, toluene diamine, etc. These polyhydric alcohols and polyamine compounds can be reacted separately with alkylene oxides or they can be pre-mixed in the preparation of polyether polyol mixtures or blends. In one embodiment, the polyoxyalkylene polyether polyols have an average of between four and eight active hydrogens per molecule and a hydroxyl number ranging from about 300 to about 700. Preferred polyester polyols are those based on terephthalic, phthalic, isophthalic, adipic, succinic, glutanic, fumaric acid(s), and combinations thereof, and the like.

The polyol is employed in a proportion corresponding to between about 0.5 and about 1.2 equivalents per equivalent of polyisocyanate. Preferably, the polyol is employed in a proportion corresponding to between about 0.8 and about 1.0 equivalents per equivalent of polyisocyanate. Below the lower limit of about 0.5 equivalent of polyol per equivalent of polyisocyanate, the resulting foam is expected to be excessively friable. Above the upper limit of about 1.2 equivalents of polyol per equivalent of polyisocyanate, the resulting foam is expected to undergo excessive interior scorching and associated foam cell structure degradation during fabrication due to the increased exotherm of reaction by the additional polyol.

By "equivalents" of polyol is meant the molecular weight divided by the number of hydroxyl groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups.

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate 1,5-napthalene diisocyanate, p-phenylene diisocyanate, 1,4-diethylbenzene diisocyanate and the like. Mixtures of two or more of the above isocyanates can be used, such as mixtures of the 2,4- and 2,6-isomers of tolylene diisocyanate, mixture of the 2,4'- and 4,4'-isomers of methylenebis(phenyl isocyanate) and the like. In addition to the 4,4'-methylenebis (phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 15° C. or higher.

Illustrative of another modified form of 4,4'-,methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide. In accordance with said process, a minor proportion of the methylenebis(phenyl isocyanate) is converted to the corresponding isocyana-to-carbodiimide and there is obtained a mixture of a major proportion of unchanged starting material and a minor proportion of said isocyanato-substituted carbodiimide.

Preferred as the polyisocyanate component is a mixture of methylenebis(phenyl isocyanate) with polymethylene polyphenyl isocyanates of higher functionality. Such mixtures are generally those obtained by phosgenation or corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The amount of catalyst employed in the compositions of the present invention is a "catalytically effective" amount, i.e., an amount sufficient to catalyze the reaction of the polyisocyanate and the polyol to form polyurethane linkages. Advantageously, the catalyst is employed in an amount corresponding to no greater than about 10 weight percent based on the weight of the total composition. Preferably, the catalyst is a tertiary amine employed in a more preferred amount corresponding to between about 0.5 and about 5 weight percent based on the weight of the total composition, although tin catalysts such as dibutyltin dilaurate, or mixtures of amine and tin catalysts are also suitably employed. When using an amine-based polyol, the urethane-forming reaction can be sufficiently auto-catalytic so as to not require the incorporation of a separate catalyst. Indeed, it is preferred not to employ a catalyst with the amine-based polyols in order to minimize the possibility of scorch of the foam. However, when using other types of polyols to fabricate foams, a catalyst is generally preferred.

Useful tertiary amines are those which are generally employed to catalyze the reaction between an isocyanato group and an epoxide group. Such catalysts are a group of compounds well-recognized in the art of synthesizing polyurethanes.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo(2-2-2)octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkylhexahydrotriazines such as N,N'N''-tris(dimethylaminomethyl)

hexahydrotriazine, N,N',N"-tris(dimethylaminoethyl)-hexahydrotriazine, N,N'N"-tris(dimethylaminopropyl)-hexahydrotriazine, N,N',N"-tris(diethylaminoethyl) hexahydrotriazine, N,N'N"-tris(diethylaminopropyl) hexahydrotriazine and the like; mono-, di-, and tri-(dialkylaminoalkyl) monohydric phenols or thiophenols such as 2-(dimethylaminomethyl)phenol, 2-dimethylaminobutyl)phenol, 2-(diethylaminoethyl)-phenol, 2-(diethylaminobutyl)phenol, 2-(dimethylaminomethyl)thiophenol, 2-(diethylaminohyl)thiophenol, 2,4-bis(dimethylaminoethyl)phenol, 2,4-bis(dipropylaminobutyl)phenol, 2,4-bis(dipropylaminoethyl)-phenol, 2,4-bis(dimethylaminoethyl)thiophenol, 2,4-bis(diethylaminopropyl)triophenol, 2,4-bis(dipropylaminoethyl)-thiophenol, 2,4,6-tris(dimethylaminoethyl)phenol, 2,4,6-tris(diethylaminoethyl)phenol, 2,4,6-tris(dipropylaminomethyl)phenol, 2,4,6-tris(diethylaminoethyl)thiophenol, 2,4,6-tris(dimethylaminoethyl) thiophenol and the like; N, N, N'N'-tetraalkylalkylenediamines such as N,N,N',N'-tetramethyl-1,3-propane diamine, N,N,N',N'-tetramethyl-l,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. Also useful are acid-blocked tertiary amine catalysts, where the blocking agent is, for example, 2-ethylhexanoic acid. The preferred tertiary amine catalysts are dimethylethanolamine (DMEA) and POLYCAT-8(a product of Abbott Corp.), N,N-dimethylcyclohexyl amine.

If desired, any organometallic compound known to be a catalyst in the reaction between an isocyanato group and an active hydrogen-containing group can be employed in the compositions of the present invention. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vaandium, copper, manganese, and zirconium. The preferred group of said organometallic derivatives is that derived from tin. Examples of this preferred group are: dibutyltin diacetate, dibutyltin dilaurate, stannous octoate, stannous oleate, and the like.

In order to achieve blowing of the foam, monochloro-difluoromethane is employed as the "sole blowing agent", a term which is intended by the present inventors to allow small amounts of water to be present in the foam formulation. In a preferred embodiment, essentially all of the blowing of the foam is provided by the monochloro-difluoromethane blowing agent. However, in a less preferred embodiment, small amounts of water of no more than 0.5 weight percent based upon the total weight of the foam formulation can be employed, and this water will provide carbon dioxide to assist in the blowing function. Generally speaking, the amount of blowing agent employed depends upon the desired density. Thus, if low density foams, i.e., 1.0 to 6 pounds per cubic foot, are desired, the amount of halogenated-hydrocarbon blowing agent is between about 5 and about 25 percent by weight based on the total weight of the composition. Preferably, the halogenated-hydrocarbon blowing agent comprises between about 10 and about 20 weight percent based on the weight of the composition.

Optional additives such as dispersing agents, cell stabilizers, surfactants, flame retardants, and the like, which are commonly employed in the fabrication of polymer foams, can be employed in the process of the invention. For example, the well-known Phosphorus-based flame retardant additives may be used if flame retardancy is desired. These phosphate additives generally do not adversely affect the physical properties of the foam even if they are hydrolyzed and/or physically removed from the foam since these additives are not part of the foam backbone. As another illustration, a finer cell structure may be obtained if organosilicone polymers are used as surfactants in the reaction mix.

Other optional additives, such as inorganic and organic fillers, can be employed in the process of this invention. Illustrative inorganic fillers are calcium carbonate, silica, glass, antimony oxides, etc. Illustrative organic fillers are the various polymers, copolymers of vinyl chloride, vinyl acetate, acrylonitrile, styrene, melamine, partially oxyalkylated melamine, etc. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

It is preferred in preparing the polyurethane foams of the invention to include in the foam forming reaction mixture a small proportion of a conventional surfactant in order to improve the cell structure of the resulting foam. Typical such surfactants are the silicones and the siloxaneoxyalkylene block copolymers. U.S. Pat. No. 2,834,748 and T. H. Ferrigno. Rigid Plastic Foams (New York:Reinhold Publishing Corp., 1963), pp. 38–42, disclose various surfactants which are useful for this purpose. Generally up to 5 parts by weight (preferably 0.2–5.0 parts) of the surfactant are employed per every 100 parts of the polyol reactant.

Any suitable portable foaming apparatus may be utilized in practicing the method of the invention. Apparatus of the general type disclosed in U.S. Pat. No. 3,769,232, issued Oct. 30, 1973 and U.S. Pat. No. 3,541,023, issued Nov. 17, 1970, are illustrative. The disclosures of both of these patents are incorporated by reference herein.

Typically, the portable foaming apparatus is comprised of at least two reactants supply tanks, a static mixer having inlets in communication with the supply tanks and an outlet for expelling the mixed reactants, means for imposing gas pressure to drive the reactants from the supply tanks, through and out of the static mixer, and flow control units for delivering the desired ratio of reactants, from their respective tanks, to the static mixer.

One of the supply tanks contains the organic isocyanate reactant or an organic isocyanate-terminated prepolymer. If desired, this tank may also contain an additive amount of a non-reactive fire-resisting material which may be used to impart flame retardant properties to the resulting foam.

The other polyurethane foam forming reactants may be supplied from one or more additional supply tanks. Usually, a single second tank is used to supply all these other reactants, i.e., polyol, foaming agent, catalyst, and surfactant, if such is used.

It is generally preferred, for proper functioning of the portable foaming apparatus, that the viscosity of the contents of each of the supply tanks be no greater than about 1500 cps at 25° C. and preferably no more than about 800 cps such as about 100–700 cps. This of course means that the materials in each tank may have to be properly selected or formulated, as the case may be, in order to meet this viscosity requirement. For example, it is common practice to adjust the viscosity of highly viscous polyether polyols by blending with them certain selected proportions of a low viscosity glycol or triol.

The portable foaming apparatus comprises a static mixer which, as defined above, is one containing no moving parts. Any such mixer which serves, in the presence of the nucleating agent, to adequately blend the reactants may be used. Illustrative such mixer is the one disclosed in U.S. Pat. No. 3,286,992.

Any means for imposing pressure to drive the reactants from the supply tanks, through and out of the static mixer may be used. Typically a pressurized gas tank, such as a nitrogen tank, is used, having valved outlets communicating, via suitable conduits, with the inlets to the supply tanks.

In utilizing the concept of the invention for effecting the nucleation of the foam forming ingredients, it is critical that the nucleating gas, or at least a portion thereof, be blended, dissolved, or absorbed into the foam forming mixture. This critical requirement is to be distinguished from conventional prior art techniques wherein a gas, for example nitrogen, is used only as a propellant; and, as such, it is not blended with the foamable mixture and therefore exerts no substantial nucleating effect. This prior art technique, as noted above, necessitates the use of an auxiliary foaming agent to achieve adequate mixing which in turn results in the generation of frothed foam, a result that this invention avoids.

Polyurethane foams prepared by the process of the invention are of utility in a variety of applications in which the foam is generated on-site from a portable foaming apparatus. This includes the production of foam-core structural and architectural panels and partitions, building and vehicular insulation, small floats, water heater insulation, picnic coolers, and a variety of molded objects for use in home furnishing.

The foams made in accordance with the present invention are generally rigid, although semi-rigid and flexible foams are also intended to be within the scope of the invention. The cellular foams made in accordance with the present invention generally have a density of between about 0.5 and about 6 pcf, preferably between about 1 and about 3 pcf.

The cellular products of the invention can be employed for all the purposes for which the currently produced cellular products are conventionally employed, but as noted above are particularly suitable when using polyether polyols for applications where higher hydrolysis resistance is required.

The following examples are intended to illustrate, but in no way limit, the scope of the present invention.

The following examples are provided to illustrate the invention. The foaming apparatus used in these examples was identical to the apparatus disclosed in U.S. Pat. No. 3,769,232 except that it did not include the valved timing assembly embodied in the apparatus of that patent. Thus the apparatus comprised (a) a first supply tank for supplying the isocyanate reactant, (b) a second supply tank for supplying the other foam forming ingredients, (c) a nitrogen pressure tank having a valved outlet in communication, via a distributing valve, with the inlets to the two supply tanks, (d) a static mixer having one outlet and two inlets communicating with the supply tanks outlets, and (e) adjustable flow control units interposed in the conduits linking the supply tank with the static mixer.

EXAMPLE 1

The portable foaming apparatus referred to above was employed to prepare a frothed, rigid, molded polyurethane foam using the procedure and ingredients described below.

The foam forming ingredients were supplied from two cylindrical metal tanks. One supply tank contained the isocyanate reactant, namely, polymethylene polyphenylene isocyanate. This material, purchased commercially under the trademark "LUPRANATE M20S", a product of BASF Corporation had a viscosity, at 25° C., of 200 cps. The other supply tank, the total content of which had a viscosity of 575 cps at 25° C., contained the following ingredients in the indicated relative proportions:

TABLE I

| CFC SYSTEM (COMPARISON) | NON-CFC SYSTEM (EXAMPLE) |
|---|---|
| "A" side = 93% polymeric isocyanate[1]<br>6% flame retardant[2]<br>1% surfactant[3]<br>"B" side = 72% sucrose amine/PO capped[4][5]<br>5% amine modifier/EO capped[6]<br>1% silicone surfactant[7]<br>1% amine catalyst[8]<br>21% R-11[9]<br>6% R-12 is added to both blends as a frothing agent. | "A" side = 99% polymeric isocyanate[1]<br>1% surfactant[3]<br>"B" side = 89% sucrose amine/PO capped[4][5]<br>7% amine modifier/EO capper[6]<br>2% silicone surfactant[10]<br>1% amine catalyst[11]<br>10% R-22 is added to the "A" side as a frothing/blowing agent and 16% R-22 is added to the "B" side as a frothing/blowing agent. |
| Processing | Processing |
| Temperature Range: 70–90° F.<br>Ratio by Volume: 1:1<br>Ratio by Weight: 100:95<br>Free-Rise Density: 1.90 pcf | Temperature Range: 70–90° F.<br>Ratio by Volume: 1:1<br>Ratio by Weight: 100:93<br>Free-Rise Density: 1.90 pcf. |

| Physical Properties - CFC SYSTEM (COMPARISON) | | | Physical Physical Properties - Non-CFC | | |
|---|---|---|---|---|---|
| | Box | Packed Panel | | Box | Packed Panel |
| Core Density, psi:<br>Compressive Strength, psi: | 1.92 | 2.46 | Core Density, psi:<br>Compressive Strength, psi: | 1.90 | 2.40 |

TABLE I-continued

| | | | | | |
|---|---|---|---|---|---|
| Parallel to Rise: | 26 | 26 | Parallel to Rise: | 23 | 26 |
| Perpendicular to Rise: | 15 | 23 | Perpendicular to Rise: | 16 | 28 |
| K-Factor, Initial: | | | K-Factor, Initial: | | |
| BTU in/hr ft² F | 0.14 | 0.14 | BTU in/hr ft² F | 0.17 | 0.14 |
| % Closed Cell | 90 | 90 | % Closed Cell | 90 | 95 |
| Dimensional Stability | | | Dimensional Stability | | |
| −20° F., 7 days | 0 | −1 | −20° F., 7 Days | 0 | 0 |
| 100° F./100% R.H. | | | 100° F./100% R.H. | | |
| 1 day | 2 | 1 | 1 day | 0 | 1 |
| 7 days | 3 | 3 | 7 days | 1 | 1 |
| 28 days | 2 | 4 | 28 days | 1 | 2 |
| 158° F./100% R.H. | | | 158° F./100% R.H. | | |
| 1 day | 9 | 10 | 1 day | 2 | 6 |
| 7 days | 8 | 14 | 7 days | 2 | 4 |
| 28 days | 5 | 15 | 28 days | 1 | 3 |

(1)LUPRANATE M20S, a product of BASF.
(2)FYROL PCF, a product of Akzo
(3)DC-5098, a product of Air Products.
(4)POLY-G 71-530, a product of Olin Corporation.
(5)POLY-G 71-357, a product of Olin Corporation.
(6)POLY-G 70-600, a product of Olin Corporation.
(7)L-5420, a product of Union Carbide.
(8)POLYCAT 8, a product of Air Products.
(9)R-11, a product of E. I. du Pont de Nemours.
(10)L-5421, a product of Union Carbide.
(11)DABCO 33LV, a product of Air Products.

Each of the two supply tanks was placed horizontally on a drum roller and rotated continuously for 2 hours at an approximate rate of 35 revolutions per minute. After the rotation was stopped, the inlets to the two supply tanks were connected to the nitrogen pressure tank and the pressure was increased to 240 psig. The tanks outlets were connected to the static mixer via separate conduits provided with flow control units. With the flow control units adjusted to deliver to the static mixer equal weight proportions from the first and second supply tanks, the foam forming ingredients were expelled, by means of the nitrogen head pressure, from their respective tanks, through the static mixer, and out into an aluminum mold preheated to 90° F. and having the dimensions 2 foot × 4 foot × 2 inches.

Table 1 provides formulation data for a non-CFC foam produced in accordance with the present invention, as compared to a comparison formulation containing CFC. The results demonstrate that the non-CFC foam produced using the process of the present invention provides comparable physical properties to the comparison CFC-containing foam. It is noted that the compressive strengths are virtually equivalent, and the k-factors of the foams are comparable. The latter result is particularly surprising in view of the fact that the non-CFC blowing agent, namely monochlorodifluoromethane, itself has a thermal conductivity that is 10–15% higher than conventional CFC blowing agents. In addition, the closed cell content of the non-CFC foam is excellent, and the dimensional stability of the non-CFC foam is surprisingly good particularly in view of the concern heretofore that HCFC blowing agents, such as monocholordifluoromethane, might cause foam softening due to solvent effects. In view of the above results, it is clear that the process of the present invention is suitable for use with pressurized foam systems.

What is claimed is:

1. A process for producing, by means of a portable foaming apparatus having a static mixer, a polyurethane foam comprising reacting a reaction mixture comprised of a polyol, an organic isocyanate, a foaming/frothing agent, and a reaction catalyst, said reaction mixture being reacted in said portable foaming apparatus comprised of
   a) a first supply tank for supplying isocyanate reactant,
   b) a second supply tank for supplying other polyurethane foam forming reactants,
   c) a nitrogen pressure tank having a valved outlet in communication with inlets to the first and second supply tanks,
   d) a static mixer having one outlet and two inlets communicating via conduits with outlets on the first and second supply tanks, and
   e) adjustable flow control units interposed in the conduits linking the supply tanks with the static mixer, wherein monochlorodifluoromethane is used as the sole foaming/frothing agent in said reaction mixture, said polyol comprises a polyether polyol having an average of between four and eight active hydrogens per molecule and a hydroxyl number ranging from about 300 to about 700, with the proviso that said polyether polyol contains no polyoxyalkylated glycerine having an OH number of from about 200 to about 300, in order to produce an essentially closed-cell rigid or semi-rigid polyurethane foam.

2. The process of claim 1 wherein said organic isocyanate is selected from the group consisting of toluene diisocyanate, methylene-bis(phenylisocyanate), polyphenylene polymethylene isocyanate, and mixtures thereof.

3. The process of claim 1 wherein said reaction mixture contains an amount of water not exceeding 0.5% based upon the total weight of the reaction mixture.

4. The process of claim 1 wherein said organic isocyanate is polyphenylene polymethylene isocyanate.

5. The process of claim 1 wherein said reaction catalyst comprises a tertiary amine.

6. The process of claim 5 wherein said tertiary amine is triethylene diamine.

7. The process of claim 1 wherein said reaction mixture also comprises a surfactant.

8. The process of claim 1 wherein said reaction catalyst comprises an organotin compound.

9. The process of claim 1 wherein the amount of monochlorodifluoromethane is from 5 weight percent to 25 weight percent, based on the total weight of the reaction mixture.

10. The process of claim 9, wherein the amount of monochlorodifluoromethane is from 10 weight percent to 20 weight percent, based on the total weight of the reaction mixture.

* * * * *